United States Patent
Granstrom et al.

(10) Patent No.: US 7,142,398 B2
(45) Date of Patent: Nov. 28, 2006

(54) ELECTROSTATIC DISCHARGE AND ELECTRICAL OVERSTRESS PROTECTION FOR MAGNETIC HEADS

(75) Inventors: Eric L. Granstrom, Golden Valley, MN (US); Ned Tabat, Chanhassen, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 443 days.

(21) Appl. No.: 10/210,608

(22) Filed: Aug. 1, 2002

(65) Prior Publication Data

US 2003/0169540 A1    Sep. 11, 2003

Related U.S. Application Data

(60) Provisional application No. 60/362,579, filed on Mar. 6, 2002, provisional application No. 60/362,366, filed on Mar. 6, 2002.

(51) Int. Cl.
G11G 51/127    (2006.01)

(52) U.S. Cl. .................................................... 360/323

(58) Field of Classification Search ............... 360/323, 360/128, 126, 319; 438/166, 149
See application file for complete search history.

(56) References Cited

U.S. PATENT DOCUMENTS

| | | | |
|---|---|---|---|
| 5,491,605 A | | 2/1996 | Hughbanks et al. |
| 5,587,857 A | | 12/1996 | Voldman et al. |
| 5,748,412 A | | 5/1998 | Murdock et al. |
| 5,757,591 A | * | 5/1998 | Carr et al. .................. 360/323 |
| 5,805,390 A | * | 9/1998 | Takeura ...................... 360/323 |
| 5,812,357 A | | 9/1998 | Johansen et al. ........... 361/212 |
| 5,847,899 A | * | 12/1998 | Fukuda et al. ........... 360/97.01 |
| 5,903,415 A | * | 5/1999 | Gill ............................ 360/323 |
| 5,963,415 A | | 10/1999 | Johansen .................... 361/212 |
| 6,046,890 A | | 4/2000 | Yamada et al. |
| 6,163,437 A | | 12/2000 | Inage et al. ................. 360/128 |
| 6,233,127 B1 | * | 5/2001 | Shimazawa ................ 360/323 |
| 6,288,880 B1 | | 9/2001 | Hughbanks et al. ........ 360/323 |
| 6,501,606 B1 | * | 12/2002 | Boutaghou et al. ........... 360/25 |
| 6,596,573 B1 | * | 7/2003 | Lee et al. .................... 438/166 |
| 6,607,923 B1 | * | 8/2003 | Carr et al. ...................... 438/3 |
| 6,642,539 B1 | * | 11/2003 | Ramesh et al. ............... 257/43 |

(Continued)

OTHER PUBLICATIONS

"Metal-Induced Laterally Crystallized Polycrystalline Silicon: Technology, Material and Devices", Man Wong, *Display Technologies III, Proceedings of SPIE*, vol. 4079 (2000), no month found.

(Continued)

*Primary Examiner*—Allen Cao
(74) *Attorney, Agent, or Firm*—Kinney & Lange, PA

(57) ABSTRACT

A magnetoresistive head assembly of the present invention includes a magnetoresistive sensor and an electrostatic discharge and electrical overstress protection circuit. The magnetoresistive sensor is capable of having conducted therethrough oppositely-directed first direction current and second direction current. The magnetoresistive sensor is sensitive to first direction currents in excess of a first predetermined value and to second direction currents in excess of a second predetermined value different than the first predetermined value. The electrostatic discharge and electrical overstress protection circuit is electrically connected to the magnetoresistive sensor for preventing only those first direction currents greater than the first predetermined value from flowing though the magnetoresistive sensor and only those second direction currents greater than the second predetermined value from flowing through the magnetoresistive sensor.

32 Claims, 4 Drawing Sheets

U.S. PATENT DOCUMENTS

| | | | | |
|---|---|---|---|---|
| 2005/0280023 | A1* | 12/2005 | Bhattacharyya | 257/107 |
| 6,710,983 | B1* | 3/2004 | Voldman | 360/323 |
| 6,833,561 | B1* | 12/2004 | Joo et al. | 257/75 |
| 2002/0048824 | A1* | 4/2002 | Carr et al. | 438/3 |

OTHER PUBLICATIONS

"Super Thin-Film Transistor with SOI CMOS Performance Formed by a Novel Grain Enhancement Method", Hongmei Wang et al., *IEEE Transactions on Electron Devices*, vol. 47, No. 8, Aug. 2000.

"A Unified Predictive TFT Model with Capability for Statistical Simulation", Jagar Singh et al., *Dept. of Electrical and Electronic Engineering, Hong Kong Univ. of Sci. & Tech., Hong Kong*, no date found.

"Pd Induced Lateral Crystallization of Amorphous Si Thin Films", Seok-Woon Lee et al., *Appl. Phys. Lett. 66* (13), Mar. 27, 1995.

"Nickel Induced Crystallization of Amorphous Silicon Thin Films", Zhonghe Jin et al., *Journal of Applied Physics*, vol. 84, No. 1, Jul. 1, 1998.

"Multiple Si Layer ICs" Motivation, Performance Analysis, and Design Implications, Shukri J. Souri et al. *Department of Electrical Engineering*. Stanford University, Stanford, CA 94305, 2000, no month.

"Electrical Characteristics of Thin-Film Transistors Using Field-Aided Lateral Crystallization", Seung-Ik Jun et al., *Applied Physics Letters*, vol. 75, No. 15, Oct. 11, 1999.

"Effects of Longitudinal and Latitudinal Grain Boundaries on the Performance of Large-Grain Polysilicon MOSFET", Singh Jagar et al., *IEEE Electron Device Letter*, vol. 22, No. 5, May 2001.

* cited by examiner

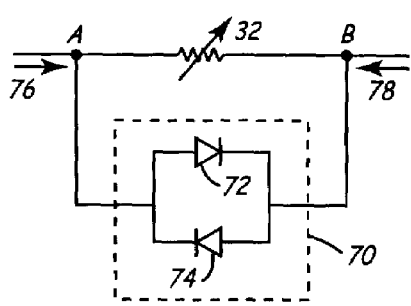
FIG. 3
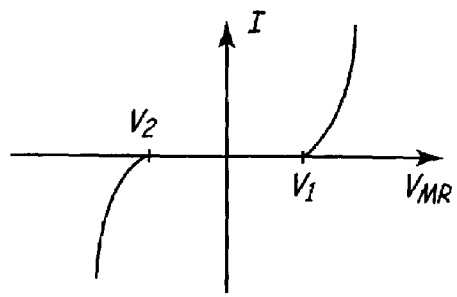
FIG. 4
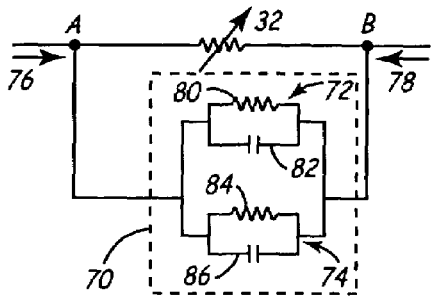
FIG. 5
(PRIOR ART)
FIG. 6
(PRIOR ART)
FIG. 7
(PRIOR ART)

ELECTROSTATIC DISCHARGE AND ELECTRICAL OVERSTRESS PROTECTION FOR MAGNETIC HEADS

CROSS-REFERENCE TO RELATED APPLICATION(S)

This application claims priority from provisional U.S. Patent Application Ser. No. 60/362,579, filed on Mar. 6, 2002, entitled "Process of Providing ESD Protection for Recording Heads", and by Eric Leroy Granstrom. This application also claims priority from provisional U.S. Patent Application Ser. No. 60/362,366, filed on Mar. 6, 2002, entitled "Asymmetric ESD Protection of Magnetic Recording", and by Eric Leroy Granstrom and Ned Tabat.

BACKGROUND OF THE INVENTION

The present invention relates generally to the field of electronic data storage and retrieval systems. In particular, the present invention relates to a magnetoresistive head assembly having asymmetrical circuitry for electrostatic discharge and electrical overstress protection.

In an electronic data storage and retrieval system, a magnetic head typically includes a reader portion having a magnetoresistive (MR) sensor for retrieving magnetically-encoded information stored on a magnetic disc. MR sensors fall generally into two broad categories: (1) anisotropic magnetoresistive (AMR) sensors and (2) giant magnetoresistive (GMR) sensors. AMR sensors generally having a single MR layer formed of a ferromagnetic material. The resistance of the MR layer varies as a function of $cos^2\theta$, where $\theta$ is the angle formed between the magnetization vector of the MR layer and the direction of the sense current flowing in the MR layer.

GMR sensors have a series of alternating magnetic and nonmagnetic layers. The resistance of GMR sensors varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers.

GMR sensors using two layers of ferromagnetic material separated by a layer of nonmagnetic electrically-conductive material are generally referred to as spin valve (SV) sensors. The layers of a SV sensor include a nonmagnetic spacer layer positioned between a ferromagnetic pinned layer and a ferromagnetic free layer. A magnetization of the pinned layer is fixed in a predetermined direction, typically normal to an air bearing surface (ABS) of the SV sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

GMR sensors using two layers of ferromagnetic material separated by a layer of nonmagnetic electrically-insulating material are generally referred to as spin-dependent tunnel junction (STJ) sensors. The layers within a STJ sensor include an ultra-thin tunnel barrier layer positioned between a ferromagnetic pinned layer and a ferromagnetic free layer. As in the SV sensor, a magnetization of the pinned layer is fixed in a predetermined direction, typically normal to an air bearing surface of the STJ sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

Such MR sensors are particularly sensitive to electrostatic discharge (ESD) and electrical overstress (EOS) during both manufacture and use of the magnetic head. Generally speaking, ESD is the discharge of electrostatic charges to or from the magnetic head (i.e., an assembler accidentally touches the magnetic head with metal tweezers and causes a spark to the MR head), while EOS is the application of a current or voltage to the head that exceeds its safe operational limits (for example, too much sense current is accidentally provided to the MR sensor during testing).

This sensitivity to electrical damage is particularly severe for MR sensors because of these sensors' relatively small physical size. The discharge of only a few volts through such a physically small resistor is sufficient to produce currents capable of severely damaging or completely destroying the MR sensor. The nature of the damage that may be experienced by an MR sensor varies significantly, including complete destruction of the sensor via melting and evaporation, contamination of an air bearing surface, generation of shorts via electrical breakdown, and milder forms of damage in which head performance may be degraded, such as sensor amplitude loss.

A common solution to the problem of ESD and EOS on magnetic heads is the use of protection circuitry connected to the MR sensor to divert large currents from the MR sensor. This circuitry generally includes nonlinear circuit components, such as diodes, transistors, and varistors, metal-semiconductor-metal and metal-insulator-metal tunnel junctions, and spark gaps configured to divert current from the MR sensor when a voltage across the MR sensor would otherwise exceed a predetermined threshold. Prior art designs assume that the electrical protection needed in both directions through the MR sensor is identical with respect to current polarity, and thus symmetrically design the circuitry for protection against excessive currents in both directions through the MR sensor.

In general, solutions to the problem of ESD and EOS sensitivity require tradeoffs between the degree of protection offered, magnetic head performance, and manufacturing cost. In particular, the addition of such protective circuitry effectively adds parasitic resistance and capacitance across the MR sensor, which adversely affect magnetic head performance.

ESD and EOS protection circuitry need only be electrically connected to the MR sensor. Thus, the ESD and EOS protection circuitry can be physically located anywhere within the electronic data storage and retrieval system. It is generally considered better, however, to locate the protection circuitry as close to the MR sensor as possible. If the protection circuitry is built on a suspension arm that suspends the magnetic head above a magnetic media, it cannot protect the MR sensor from ESD damage caused prior to the mounting of the MR sensor onto the suspension arm. Furthermore, protection strategies using circuits located physically closer to the MR sensor have a better protective response speed and effectiveness than those using circuits located distant from the MR sensor. It has been suggested that the protection circuitry be built directly upon a slider body upon which the magnetic head is built. However, few prior art techniques of building silicon semiconductor devices on traditional alumina-titanium-carbide (AlTiC) slider bodies exist (and such known processes are difficult and/or ineffective to implement), and processing issues still exist with the use of silicon slider bodies.

BRIEF SUMMARY OF THE INVENTION

A magnetoresistive head assembly of the present invention includes a magnetoresistive sensor and an electrostatic discharge and electrical overstress protection circuit. The magnetoresistive sensor is capable of having conducted therethrough oppositely-directed first direction current and second direction current. The magnetoresistive sensor is sensitive to first direction currents in excess of a first predetermined value and to second direction currents in excess of a second predetermined value different than the first predetermined value. The electrostatic discharge and electrical overstress protection circuit is electrically connected to the magnetoresistive sensor for preventing only those first direction currents greater than the first predetermined value from flowing though the magnetoresistive sensor and only those second direction currents greater than the second predetermined value from flowing through the magnetoresistive sensor.

BRIEF DESCRIPTION OF THE DRAWINGS

FIG. 3 is a cross-sectional view of a spin valve sensor.

FIG. 4 is a cross-sectional view of a spin-dependent tunnel junction sensor.

FIG. 5 is a circuit schematic of an illustrative prior art electrostatic discharge and electrical overstress protection circuit arranged in parallel with a magnetoresistive sensor.

FIG. 6 is a graph illustrating the operation of the protection circuit of FIG. 5. Specifically, FIG. 6 is a graph of the amount of current through the protection circuit as a function of the voltage across the MR sensor.

FIG. 7 is a circuit schematic illustrating parasitic resistances and capacitances associated with the protection circuit of FIG. 5 while operating at conventional magnetic head bias conditions.

FIG. 9 is a graph of the amount of current through the protection circuit as a function of the voltage across the MR sensor.

DETAILED DESCRIPTION

Figure 1:
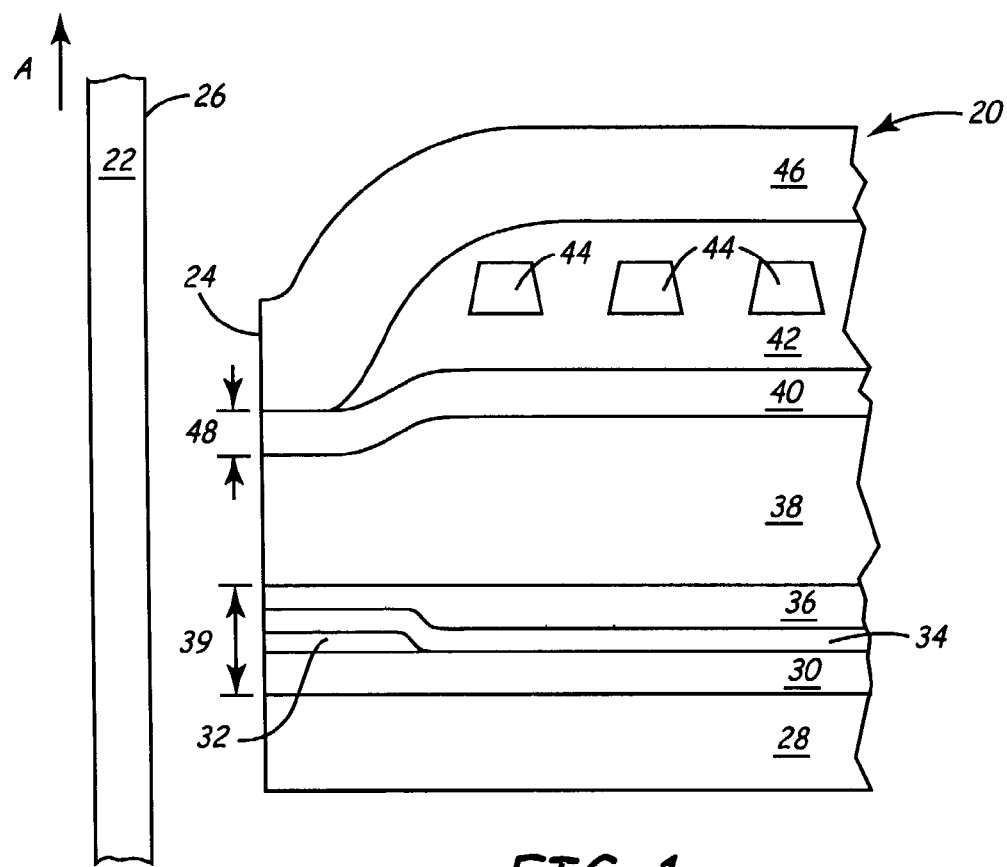
FIG. 1 is a cross-sectional view of a magnetic head and a magnetic disc taken along a plane normal to an air bearing surface of the magnetic head.

FIG. 1 is a cross-sectional view of magnetic head 20 and magnetic disc 22 taken along a plane normal to air bearing surface (ABS) 24 of magnetic head 20. It should be understood that while FIG. 1 illustrates the overall structure of magnetic head 20, the actual dimensions of individual elements of magnetic head 20 are not shown to scale.

ABS 24 of magnetic head 20 faces disc surface 26 of magnetic disc 22. Magnetic disc 22 travels or rotates in a direction relative to magnetic head 20 as indicated by arrow A. The spacing between ABS 24 and disc surface 26 is preferably minimized while avoiding contact between magnetic head 20 and magnetic disc 22. In most cases, contact between magnetic head 20 and magnetic disc 22 would damage both magnetic head 20 and magnetic disc 22.

A reader portion of magnetic head 20 includes first magnetic layer 28, first insulator layer 30, magnetoresistive (MR) sensor 32, metal contact layer 34, second insulator layer 36, and second magnetic layer 38. Read gap 39 is defined on ABS 24 between terminating ends of first insulator layer 30 and metal contact layer 34. Metal contact layer 34 is positioned between first insulator layer 30 and second insulator layer 36. MR sensor 32 is positioned between terminating ends of first insulator layer 30 and metal contact layer 34. First and second magnetic layers 28 and 38 function as shields for MR sensor 32.

A writer portion of magnetic head 20 includes second magnetic layer 38, write gap layer 40, third insulator layer 42, conductive coil 44, and third magnetic layer 46. Write gap 48 is defined on ABS 24 by write gap layer 40 between terminating ends of second magnetic layer 38 and third magnetic layer 46. Electrically conductive coils 44 are provided to generate magnetic fields across write gap 48 and are positioned in third insulator layer 42 between write gap layer 40 and third magnetic layer 46. While FIG. 1 shows a single layer of conductive coils 44, it is understood in the art that several layers of conductive coils separated by several insulator layers may be used. Second and third magnetic layers 38 and 46 function as poles of the writer portion of magnetic head 20.

Magnetic head 20 is a merged magnetic head in which second magnetic layer 38 is employed both as a top shield in the reader portion and as a bottom pole in the writer portion. Transducing head 20 may also be arranged as a piggyback magnetic head, in which second magnetic layer 38 is formed of two separate magnetic layers.

Figure 2:
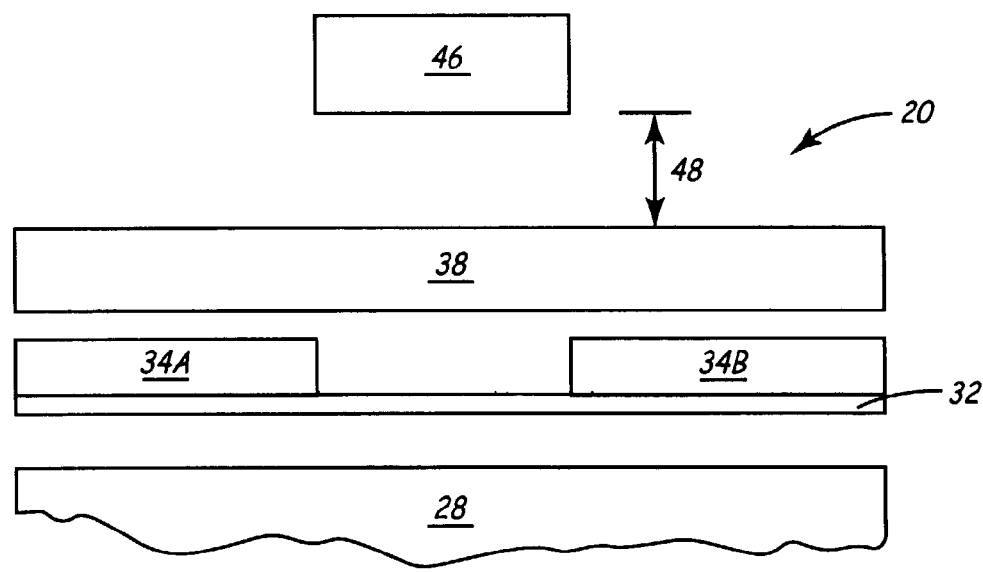
FIG. 2 is a layered diagram of the magnetic head of FIG. 1, illustrating the location of a plurality of magnetically significant elements of the magnetic head as they appear along an air bearing surface of the magnetic head.

FIG. 2 is a layered diagram of magnetic head 20 shown in FIG. 1, illustrating the location of a plurality of magnetically significant elements of magnetic head 20 as they appear along ABS 24 of magnetic head 20. In FIG. 2, all spacing and insulating layers are omitted for clarity. First and second magnetic layers 28 and 38 are spaced to provide for a location of MR sensor 32. MR sensor 32 has two passive regions defined as the portions of MR sensor 32 positioned adjacent to metal contacts 34A and 34B. An active region of MR sensor 32 is defined as the portion of MR sensor 32 located between the two passive regions of MR sensor 32. The active region of MR sensor 32 defines a read sensor width.

MR sensor 32 is preferably a giant magnetoresistive (GMR) sensor. An MR sensor is generally formed of a ferromagnetic material whose resistance fluctuates in response to an external magnetic field, preferably from a magnetic medium or disc. GMR sensors have a series of alternating magnetic and nonmagnetic layers. The resistance of a GMR sensor varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers. GMR sensors using two layers of ferromagnetic material separated by a layer of nonmagnetic electrically-conductive material are generally referred to as spin valve (SV) sensors, while GMR sensors using two layers of ferromagnetic material separated by a layer of nonmagnetic electrically-insulating material are generally referred to as spin-dependent tunnel junction (STJ) sensors.

FIG. 3 is a cross-sectional view of SV-type GMR sensor 50. SV sensor 50 has free layer 52, spacer layer 54, pinned layer 56, and antiferromagnetic layer 58. Free layer 52 and pinned layer 56 are each layers of ferromagnetic materials separated by nonmagnetic, electrically-conductive spacer layer 54. Antiferromagnetic layer 58 is positioned adjacent pinned layer 56, such that pinned layer 56 is positioned between spacer layer 54 and antiferromagnetic layer 58. Alternately, pinned layer 56 may be a synthetic antiferromagnetic having two ferromagnetic layers separated by a thin decoupling layer preferably formed of ruthenium. Antiferromagnetic layer 58 is magnetically exchange coupled to pinned layer 56 to fix a magnetization of pinned layer 56 in a predetermined direction, although other means of fixing the magnetization of pinned layer 56 are available. A magnetization of free layer 52 is free to rotate in response to an external magnetic field.

FIG. 4 is a cross-sectional view of a STJ-type GMR sensor 60. STJ sensor 60 includes free layer 62, barrier layer 64, pinned layer 66, and antiferromagnetic layer 68. Free layer 62 and pinned layer 66 are each layers of ferromagnetic materials separated by ultra-thin, nonmagnetic, electrically-insulating barrier layer 64. Antiferromagnetic layer 68 is positioned adjacent pinned layer 66, such that pinned layer is positioned between barrier layer 64 and anti ferromagnetic layer 68. Antiferromagnetic layer 68 is magnetically exchange coupled to pinned layer 66 to fix a magnetization of pinned layer 66 in a predetermined direction, although other means of fixing the magnetization of pinned layer 66 are available. A magnetization of free layer 62 is free to rotate in response to an external magnetic field.

MR sensors, such as those illustrated in FIGS. 3 and 4, are particularly sensitive to electrostatic discharge (ESD) and electrical overstress (EOS) during both manufacture and use of magnetic head 20. A common solution to the problem of ESD and EOS on magnetic heads is the use of protection circuitry connected to the MR sensor to divert large currents from the MR sensor. This circuitry generally includes non-linear circuit components, such as diodes, transistors, varistors, metal-semiconductor-metal and metal-insulator-metal tunnel junctions, and spark gaps configured to divert current from the MR sensor when a voltage across the MR sensor exceeds a predetermined threshold. Prior art designs assume that the protection needed in both directions through the MR sensor is identical, and thus symmetrically design the circuitry for protection against excessive currents in both directions through the MR sensor.

FIG. 5 is a circuit schematic of illustrative prior art ESD and EOS protection circuitry 70 arranged in parallel with MR sensor 32. Protection circuitry 70 includes parallel and oppositely-directed first and second diodes 72 and 74. First and second diodes 72 and 74 are equivalent to each other. As the voltage at terminal A of MR sensor 32 increases with respect to the voltage at terminal B of MR sensor 32, current in first direction 76 through MR sensor 32 also increases. Once the voltage between terminals A and B exceeds a first threshold value $V_1$, first diode 72 turns on to divert excess current in first direction 76 from MR sensor 32. Similarly, as the voltage at terminal B of MR sensor 32 increases with respect to the voltage at terminal A of MR sensor 32, current in second direction 78 through MR sensor 32 increases. Once the voltage between terminals B and A exceeds a second threshold value $V_2$, second diode 74 turns on to divert excess current in second direction 78 from MR sensor 32.

FIG. 6 is a graph illustrating the operation of protection circuitry 70. Specifically, FIG. 6 is a graph of the amount of current through protection circuitry 70 as a function of the voltage across MR sensor 32. As is standard in prior art designs, protection circuitry 70 is symmetrically designed such that the absolute values of first and second threshold values $V_1$ and $V_2$ are substantially equal to each other. Prior art designs recognize the commonly held belief that the same degree of protection is necessary for currents flowing in both first and second directions 76 and 78 through MR sensor 32.

This prior art assumption, however, neglects the role of a self-induced magnetic field caused by ESD or EOS in the failure of MR sensors. ESD and EOS failure of a magnetic head has traditionally been considered a thermally-induced failure in which heat generated by the excess current through the MR sensor causes damage to the sensor. Such thermally-induced failures are in fact symmetrical. However, a self-induced magnetic field generated by excessive currents through a GMR sensor can also be damaging to the sensor. This type of magnetically-induced damage is not symmetrical. Currents through a GMR sensor will induce a circular magnetic field in the free layer and the pinned layer of the sensor. Depending upon the direction of current through the GMR sensor, the magnetic field will either align itself in parallel with or antiparallel to the magnetization of the pinned layer. If the magnetic field is strong enough in the direction opposite the magnetization of the pinned layer, it may reverse the magnetization of the pinned layer, thus damaging the sensor, while large magnetic fields in the direction of the magnetization of the pinned layer only reinforce the magnetization of the pinned layer. In a magnetic head having an synthetic antiferromagnetic, a magnetization of the two ferromagnetic layers of the antiferromagnetic may reverse directions similarly. Thus, different amounts of protection are needed for currents in opposite directions through the GMR sensor.

Although it is not necessary to design symmetrical ESD and EOS protection circuitry, magnetic head designers can continue using symmetrical protection circuitry by simply building in more protection than is needed in one of the two directions through the GMR sensor. However, this additional protection comes at the cost of the overall performance of magnetic head.

FIG. 7 is a circuit schematic illustrating parasitic resistances and capacitances associated with ESD and EOS protection circuitry 70 of FIG. 5 while operating at conventional magnetic head bias conditions. First diode 72 has associated with it first parasitic resistor 80 and first parasitic capacitor 82, while first parasitic resistor 84 and first parasitic capacitor 86 are associated with second diode 74. The introduction of these parasitic resistances and capacitances to magnetic head 20, through the addition of protection circuitry 70, degrades the performance of magnetic head 20. For ease of explanation, FIG. 6 illustrates a more ideal operation of first and second diodes 72 and 74 than actually results. In fact, some current will flow through first diode 72 prior to the voltage across MR sensor 32 reaching first threshold voltage $V_1$. Similarly, some current will flow through second diode 74 prior to the voltage across MR sensor reaching second threshold voltage $V_2$. Thus, actual sense current provided to MR sensor 32 will be diverted by protection circuitry 70, thus degrading the amplitude of the read signal. Additionally, the presence of parasitic resistances and capacitances degrades the frequency response of magnetic head 20.

The present invention recognizes that ESD and EOS protection circuitry should be designed to accommodate the above-noted differential sensitivity to ESD and EOS by providing greater protection to an electric pulse of a given polarity than the opposite polarity.

Figure 8:
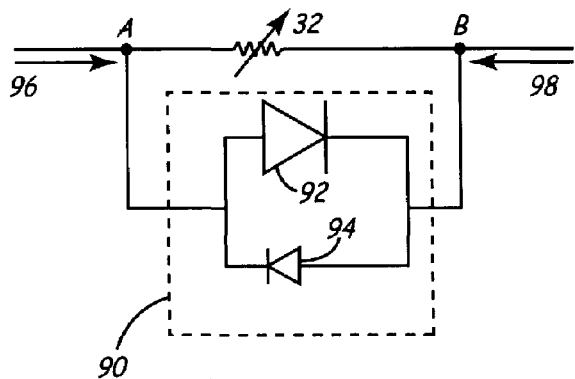
FIG. 8 is a circuit schematic of an electrostatic discharge and electrical overstress protection circuit in accord with the present invention.

FIG. 8 is a circuit schematic of ESD and EOS protection circuitry 90 in accord with the present invention. Protection circuitry 90 includes parallel and oppositely-directed first and second diodes 92 and 94. In FIG. 8, first diode 92 is drawn larger in size than second diode 94 to graphically illustrate the larger parasitic capacitance and smaller parasitic resistance associated with first diode 92. Similar to the protection circuitry of FIG. 5, as the voltage at terminal A of MR sensor 32 increases with respect to the voltage at terminal B of MR sensor 32, current in first direction 96 through MR sensor 32 also increases. Once the voltage between terminals A and B exceeds a first threshold value $V_1$, first diode 92 turns on to divert excess current in first direction 96 from MR sensor 32. Similarly, as the voltage at terminal B of MR sensor 32 increases with respect to the voltage at terminal A of MR sensor 32, current in second direction 98 through MR sensor 32 increases. Once the voltage between terminals B and A exceeds a second threshold value $V_2$, second diode 94 turns on to divert excess current in second direction 98 from MR sensor 32.

Figure 9:
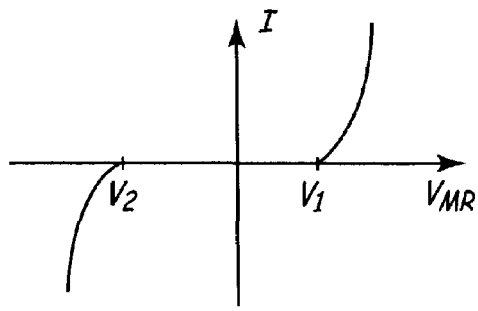
FIG. 9 is a graph illustrating the operation of the protection circuit of FIG. 8. Specifically.

FIG. 9 is a graph illustrating the operation of protection circuitry 90. Specifically, FIG. 9 is a graph of the amount of current through protection circuitry 90 as a function of the voltage across MR sensor 32. Importantly, because of the differing parasitic resistances and capacitances associated with first and second diodes 92 and 94, the absolute values of first and second threshold values $V_1$ and $V_2$ are not equal to one another; rather, the absolute value of first threshold value $V_1$ is less than the absolute value of second threshold value $V_2$.

By diverting current when the voltage across MR sensor 32 exceeds either of first or second threshold values $V_1$ or $V_2$, protection circuitry 90 effectively prevents currents in excess of predetermined values $I_1$ and $I_2$ from flowing through MR sensor 32. Predetermined value $I_1$ equals the first threshold value $V_1$ divided by the resistance of MR sensor 32, and predetermined value $I_2$ equals the second threshold value $V_2$ divided by the resistance of MR sensor 32. Predetermined value $I_1$ is preferably selected to prevent a magnetically-induced breakdown of MR sensor 32, while predetermined value $I_2$ is preferably selected to prevent a thermally-induced breakdown of MR sensor 32. Since MR sensor 32 is susceptible to a magnetically-induced breakdown from currents in a single direction therethrough only, protection circuitry 90 is preferably asymmetrically designed to divert currents in excess of $I_1$ in only that susceptible direction. Since MR sensor 32 is susceptible to a thermally-induced breakdown from currents flowing in either direction therethrough, protection circuitry 90 is preferably designed to divert currents in excess of predetermined value $I_2$ in either direction.

An asymmetrical ESD and EOS protection circuit offers the advantage of a greater degree of overall ESD and EOS protection for a given level of introduced head parasitics. Because the parasitic resistances and capacitances of ESD and EOS protection circuitry are often an important design limitation, they can limit the use of such protection circuitry. Using asymmetric protection, and thus introducing minimal parasitics, may considerably reduce the need to suffer from performance sacrifices to accommodate ESD and EOS protection. Thus, the present invention recognizes that ESD and EOS protection circuitry is preferably designed asymmetrically to: (1) maximize ESD and EOS protection by minimizing the likelihood of damage due to ESD and EOS, (2) maximize performance by minimizing the effect of parasitic resistances and capacitances, or (3) strike a better balance between magnetic head performance and the degree of ESD and EOS protection offered.

Figure 10:
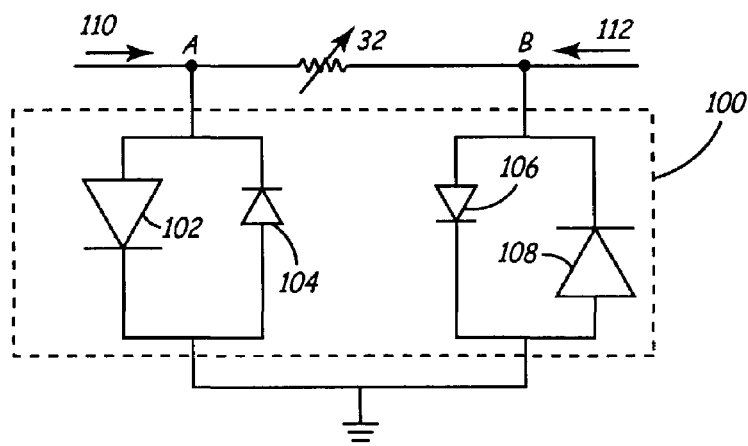
FIG. 10 is a circuit schematic of an electrostatic discharge and electrical overstress protection circuit in accord with the present invention.

FIG. 10 is a circuit schematic of ESD and EOS protection circuitry 100 in accord with the present invention. Protection circuitry 100 includes first diode 102, second diode 104, third diode 106, and fourth diode 108. First and second diodes 102 and 104 are arranged in parallel, are oppositely directed, and are connected between terminal A of MR sensor 32 and a ground. Similarly, third and fourth diodes 106 and 108 are arranged in parallel, are oppositely directed, and are connected between terminal B of MR sensor 32 and ground. In FIG. 10, first and fourth diodes 102 and 108 are drawn larger in size than second and third diodes 104 and 106 to graphically illustrate the smaller parasitic resistances associated with first and fourth diodes 102 and 108. In operation, as the voltage at terminal A of MR sensor 32 increases with respect to the voltage at terminal B of MR sensor 32, current in first direction 110 through MR sensor 32 also increases. Once the voltage at terminal A exceeds a first threshold value $V_1$, first and fourth diodes 92 and 108 turn on to divert excess current in first direction 110 from MR sensor 32. Similarly, as the voltage at terminal B of MR sensor 32 increases with respect to the voltage at terminal A of MR sensor 32, current in second direction 112 through MR sensor 32 increases. Once the voltage at terminal B exceeds a second threshold value $V_2$, second and third diodes 104 and 106 turn on to divert excess current in second direction 112 from MR sensor 32.

FIGS. 8 and 10 illustrate two configurations of ESD and EOS protection circuitry. However, as recognized by those skilled in the art of magnetic head design, many different configurations and arrangements of ESD and EOS protection circuitry are possible. Additionally, FIGS. 8 and 10 illustrate only diode-based circuitry, but those skilled in the art of magnetic head design will further recognize that the protection circuitry may be designed of various circuit components, including but not limited to transistors, varistors, metal-semiconductor-metal tunneljunctions, metal-insulator-metal tunneljunctions, spark gaps, and field emission devices. As with diodes, non-identical pairs of transistors and varistors can be used to provide asymmetric protection. Metal-semiconductor-metal tunnel junctions and metal-insulator-metal tunnel junctions, which are often characterized by their asymmetrical responses to voltages, also provide good candidates for asymmetrical protection circuitry. This asymmetry of these devices may be optimized by the choice of asymmetrical metals on either side of the junction, by asymmetrical process conditions in fabricating the metals on either side of the junction, by grading the semiconductor or insulator barrier, or by using multiple barrier layers with differing properties.

As is well known in the prior art, the protection circuitry may reside in any of a plurality of locations within the magnetic data storage and retrieval system. Often, the protection circuitry is located on the suspension, the flex-on-suspension, or within the pre-amplifier. However, all of these locations locate the protection circuitry off the slider upon which the magnetic head is mounted, and thereby limit the fabrication period during which the magnetic head is protected. The slider is fabricated on a wafer with thousands of other sliders. The wafer is then cut into individual sliders, each of which is manually attached to the suspension. If the protection circuitry resides on the suspension, there is no ESD and EOS protection until after the suspension is attached to the slider. Thus, the magnetic head is susceptible to ESD and EOS damage during a substantial period of the magnetic head's fabrication. Furthermore, protection strategies using circuits located physically closer to the MR sensor have a better protective response speed and effectiveness than those circuits located distant from the MR sensor.

Others have proposed that the protection circuitry, generally formed of silicon, reside on the slider itself. Silicon, however, when deposited in thin film form, typically has electrical properties incompatible with high quality semiconductor device requirements. Further, while high quality crystalline silicon has sufficient electrical performance, its conventional fabrication on a slider would require the abandonment of conventional magnetic recording substrates having preferable thermal and mechanical properties.

Figure 11:
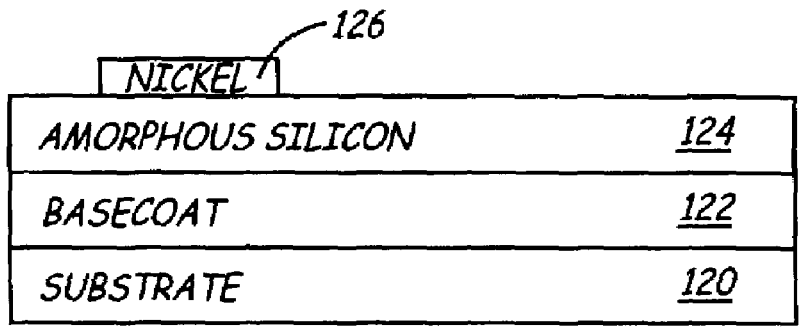
FIGS. 11–13 illustrate a metal-induced-lateral-crystallization method for forming silicon semiconductor devices for use electrostatic discharge and electrical overstress protection circuitry on a non-silicon slider.
Figure 12:
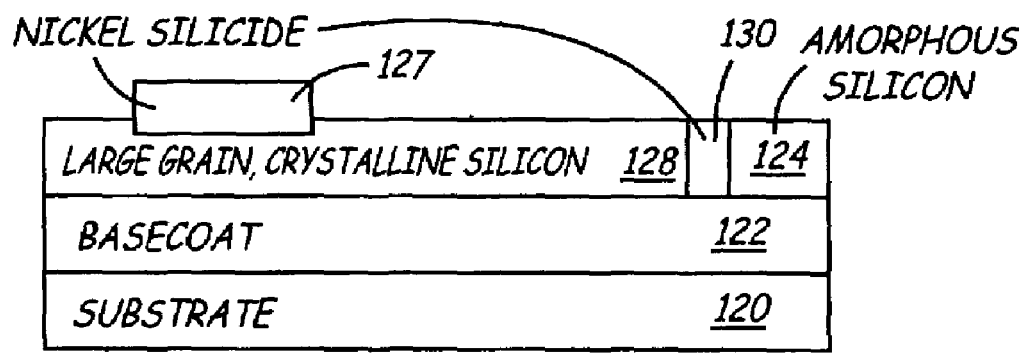
Figure 13:
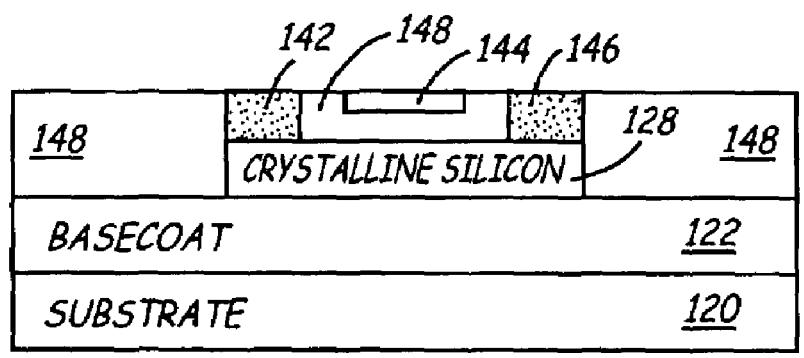

Thus, the present invention also introduces a metal-induced-lateral-crystallization (MILC) method for forming silicon semiconductor devices for use protection circuitry, as well as for use in signal processing, amplification, and conditioning in other magnetic recording head applications, on a slider. FIGS. 11–13 illustrate this method. As shown in FIG. 11, basecoat 122 and amorphous silicon layer 124 are sequentially deposited on substrate 120 (or slider body). Substrate 120 is preferably a material such as alumina-titanium-carbide (AlTiC). Basecoat 122 is preferably formed of an insulating material, such as alumina, and is preferably formed thinner than conventional basecoats. Amorphous silicon layer 124 is deposited by conventional means, such as physical vapor deposition (PVD) sputtering, evaporation or a low temperature plasma-enhanced chemical vapor deposition (PECVD) process to a thickness of about 100 nm. Next, catalyst 126, formed of a material such as nickel or palladium, is patterned onto a portion of amorphous silicon layer 124. In the example of FIGS. 11–13, catalyst 126 is formed of nickel. Catalyst 126 is preferably quite small in area, perhaps 10 nanometers thick, 1 micrometer wide, and few micrometers long. Catalyst 126 can be patterned using conventional liftoff or etching processes. The structure of FIG. 11 is then thermally annealed at a temperature less than about 500° C.

FIG. 12 illustrates the structure of FIG. 11 after it has been thermally annealed. The annealing process transforms catalyst 126 into nickel suicide layer 127, which radially diffuses nickel silicide through amorphous silicon layer 124 to form large grain, polycrystalline silicon layer 128 (having a low residual nickel concentration), which is encircled by nickel silicide layer 130, which is in turn encircled by unchanged amorphous silicon layer 124. Crystalline silicon layer 128 is a region of silicon of high quality with large crystalline grains of about 1 to about 10 μm in size, and which are capable of sustaining conventional semiconductor-grade devices. Nickel silicide layers 127 and 130, as well as amorphous silicon layer 124, may be etched away as shown in FIG. 13. Crystalline silicon layer 128 can then be doped to form n and p regions, and patterned into discrete diodes, transistors, and/or other circuit elements. FIG. 13 illustrates crystalline silicon layer 128 being patterned into a transistor having source 142, gate 144, and drain 146, all of which are enveloped in insulator 148 formed of an insulating material such as alumina.

The finished active device can then be buried in a field of an insulating material, such as alumina. The combined thickness of basecoat 122, the active device, and the final insulating layer are preferably substantially equal to the thickness of a conventional basecoat, thus leaving a substrate and basecoat that is virtually unchanged from prior art designs for subsequent magnetic head fabrication, but which has circuit elements embedded therein. Alternatively, the active device can be built elsewhere on the slider in a similar fashion.

The above process can also be used to fabricate Shottky diodes which do not require that crystalline silicon layer 128 be doped into n and p regions. This is particularly advantageous as many manufacturers of magnetic heads do not possess the necessary silicon dopant-equipment, and such equipment is expensive to obtain and use.

The above process is particularly advantageous for building circuit components on traditional AlTiC sliders, but it is also useful on silicon sliders. For instance, a slider formed of silicon may nonetheless be of an inferior quality silicon upon which high quality semiconductor devices cannot be deposited. Further, it is also possible to three-dimensionally build high quality semiconductor devices using the method of the present invention. That is, several layers of semiconductor devices can be built upon one another. Even with a good quality silicon slider, traditional methods of building semiconductor devices would allow for only a two-dimensional build.

Another advantage of this MILC process for fabricating silicon-based circuit components on the slider is cost. By fabricating these components on the slider, thousands of components can be simultaneously built on the wafer level, as opposed to be manually added to each slider individually.

Location of the ESD and FOS protection circuitry is also particularly advantageous for high frequency applications. For high frequency, or short duration, ESD and EOS, an impedance of the wire connecting the ESD and EOS protection circuitry increases until the point where the combined impedance of the wire and the protection circuitry is greater than the resistance of the MR sensor, thus preventing the protection circuitry from diverting excess currents. Thus, ESD and EOS protection circuitry located off the slider are not be as effective for high frequency transient protection.

In conclusion, the present invention recognizes that ESD and EOS protection circuitry should be designed to accommodate the differential sensitivity to ESD and EOS of a MR sensor by providing greater protection to an electric pulse of a given polarity than the opposite polarity. This differential protection is provided through use of asymmetrical ESD and EOS protection circuitry. The present invention also introduces a MILC process for fabricating semiconductor circuit components on a slider body. This method is useful in fabricating circuit components for use not only as ESD and EOS protection circuitry, but also for use in signal amplification, processing, and conditioning in magnetic head applications, fly height or temperature-based control systems or sensors.

Incorporated herein by reference is provisional U.S. Patent Application Ser. No. 60/362,579, filed on Mar. 6, 2002, entitled "Process of Providing ESD Protection for Recording Heads", by Eric Leroy Granstrom. Also incorporated herein by reference is provisional U.S. Patent Application Ser. No. 60/362,366, filed on Mar. 6, 2002, entitled "Asymmetric ESD Protection of Magnetic Recording", by Eric Leroy Granstrom and Ned Tabat.

Although the present invention has been described with reference to preferred embodiments, workers skilled in the art will recognize that changes may be made in form and detail without departing from the spirit and scope of the invention.

The invention claimed is:

1. A magnetoresistive head assembly comprising:
   a slider body;
   a metal-induced-laterally-crystallized silicon layer on the slider body; and
   a circuit element formed in the silicon layer.

2. The magnetoresistive head assembly of claim 1 and further comprising:
   an insulating layer formed on the metal-induced-laterally-crystallized silicon layer;
   a magnetoresistive sensor formed on the insulating layer; and
   a circuit that includes the circuit element and that electrically connects to the magnetoresistive sensor.

3. The magnetoresistive head assembly of claim 2 wherein the circuit is for preventing a current greater than a first predetermined value from flowing in a first direction through the magnetoresistive sensor and for preventing a current greater than a second predetermined value different than the first predetermined value from flowing in a second direction opposite the first direction through the magnetoresistive sensor.

4. The magnetoresistive head assembly of claim 3 wherein the first and the second predetermined values are independently selected to prevent a breakdown of the magnetoresistive sensor due to current in excess of the respective first and second predetermined values in the respective first and second directions through the magnetoresistive sensor.

5. The magnetoresistive head assembly of claim 2 wherein the circuit is for amplifying a read signal from across the magnetoresistive sensor.

6. The magnetoresistive head assembly of claim 2 wherein the circuit is for conditioning a read signal from across the magnetoresistive sensor.

7. The magnetoresistive head assembly of claim 2 wherein the circuit is for fly height control of the slider body.

8. A method of forming a magnetoresistive head assembly, the method comprising:
   forming a slider body;
   forming a metal-induced-laterally-crystallized silicon layer; and
   patterning an circuit element in the metal-induced-laterally-crystallized silicon layer.

9. The method of claim 8 wherein forming a metal-induced-laterally-crystallized silicon layer comprises:
   forming an amorphous silicon layer;
   patterning a catalyst material on a first portion of the amorphous silicon layer; and
   annealing the magnetoresistive head assembly at a temperature to induce crystallization of a second portion of the amorphous silicon layer different than the first portion of the amorphous silicon layer.

10. The method of claim 9 wherein the catalyst material is selected from the group consisting of nickel and palladium.

11. The method of claim 9 wherein the temperature at which the magnetoresistive head assembly is annealed is less than about 500° C.

12. The method of claim 8 and further comprising:
    forming a magnetoresistive sensor; and
    forming a circuit that includes the circuit element, the circuit being electrically connected to the magnetoresistive sensor.

13. The method of claim 12 wherein the circuit is for preventing a current greater than a first predetermined value from flowing in a first direction through the magnetoresistive sensor and for preventing a current greater than a second predetermined value different than the first predetermined value from flowing in a second direction opposite the first direction through the magnetoresistive sensor.

14. The method of claim 13 wherein the first and the second predetermined values are independently selected to prevent a breakdown of the magnetoresistive sensor due to current in excess of the respective first and second predetermined values in the respective first and second directions through the magnetoresistive sensor.

15. The method of claim 12 wherein the circuit is for amplifying a read signal from across the magnetoresistive sensor.

16. The method of claim 12 wherein the circuit is for conditioning a read signal from across the magnetoresistive sensor.

17. The method of claim 12 wherein the circuit is for fly height control of the slider body.

18. A method of forming an circuit element on a slider of a magnetic head assembly, the method comprising:
    forming a slider body;
    forming a basecoat on the slider body;
    forming a metal-induced-laterally-crystallized silicon layer on the basecoat; and
    patterning a circuit element in the silicon layer.

19. The method of claim 18 wherein forming a metal-induced-laterally-crystallized silicon layer comprises:
    forming an amorphous silicon layer on the basecoat;
    patterning a catalyst material on a first portion of the amorphous silicon layer;
    annealing the slider body at a temperature to induce crystallization of a second portion of the amorphous silicon layer different than the first portion of the amorphous silicon layer.
    patterning a circuit element in the second portion of the amorphous silicon layer;

20. The method of claim 19 wherein the catalyst material is selected from the group consisting of nickel and palladium.

21. The method of claim 19 wherein the temperature at which the slider is annealed is less than about 500° C.

22. A magnetoresistive head assembly comprising:
    a magnetoresistive sensor capable of having conducted therethrough oppositely-directed first direction current and second direction current, the magnetoresistive sensor being sensitive to first direction currents in excess of a first predetermined value and to second direction currents in excess of a second predetermined value different than the first predetermined value; and
    an electrostatic discharge and electrical overstress protection circuit electrically connected to the magnetoresistive sensor for preventing only those first direction currents greater than the first predetermined value from flowing though the magnetoresistive sensor and only those second direction currents greater than the second predetermined value from flowing through the magnetoresistive sensor.

23. The magnetoresistive head assembly of claim 22 and further comprising a slider body upon which the magnetoresistive sensor is formed.

24. The magnetoresistive head assembly of claim 22 and further comprising:
a slider body;
a metal-induced-laterally-crystallized silicon layer on the slider body;
a circuit element formed in the silicon layer; and
an insulating layer formed on the silicon layer and upon which the magnetoresistive sensor is formed.

25. The magnetoresistive head assembly of claim 24 wherein the electrostatic discharge and electrical overstress protection circuit includes the circuit element.

26. A device comprising:
a substrate;
a metal-induced-laterally-crystallized silicon layer formed on the substrate;
an insulating layer over the silicon layer; and
a magnetoresistive element over the insulating layer; and
a circuit electrically connected to the magnetoresistive sensor, wherein at least one element of the circuit is formed in the silicon layer.

27. The device of claim 26 wherein the circuit is for preventing a current greater than a first predetermined value from flowing in a first direction through the magnetoresistive element and for preventing a current greater than a second predetermined value from flowing in a second direction opposite the first direction through the magnetoresistive element.

28. The device of claim 27 wherein the first predetermined value differs from the second predetermined value.

29. The device of claim 27 wherein the first and the second predetermined values are independently selected to prevent a breakdown of the magnetoresistive element due to current in excess of the respective first and second predetermined values in the respective first and second directions through the magnetoresistive element.

30. The device of claim 26 wherein the circuit is an electrostatic discharge and electrical overstress protection circuit for the magnetoresistive element.

31. The device of claim 26 wherein the circuit is for amplifying a read signal detected across the magnetoresistive element.

32. The device of claim 26 wherein the circuit is for conditioning a read signal detected across the magnetoresistive element.

* * * * *

UNITED STATES PATENT AND TRADEMARK OFFICE
CERTIFICATE OF CORRECTION

PATENT NO.        : 7,142,398 B2
APPLICATION NO. : 10/210608
DATED             : November 28, 2006
INVENTOR(S)       : Eric L. Granstrom et al.

It is certified that error appears in the above-identified patent and that said Letters Patent is hereby corrected as shown below:

On 2nd Page of Cover Page, Column 2, Line 13, delete "Letter", insert --Letters--

Column 5, Line 14-15, delete "antiferro-magnetic", insert --antiferro-magnet--

Column 8, Line 45, delete "tunneljunctions", insert --tunnel junctions--

Column 8, Line 46, delete "tunneljunctions", insert --tunnel junctions--

Column 12, Line 40, delete "layer.", insert --layer;--

Signed and Sealed this

Sixth Day of March, 2007

JON W. DUDAS
*Director of the United States Patent and Trademark Office*